United States Patent [19]
Lee

[11] Patent Number: 5,956,891
[45] Date of Patent: Sep. 28, 1999

[54] ANIMAL TRAP

[76] Inventor: Donald R. Lee, Box 588, Sundance, Wyo. 82729

[21] Appl. No.: 08/780,408

[22] Filed: Jan. 9, 1997

[51] Int. Cl.[6] .................................................. A01M 23/34
[52] U.S. Cl. .................................................. 43/87
[58] Field of Search ................................... 43/85, 86, 87

[56] References Cited

U.S. PATENT DOCUMENTS

| | | | |
|---|---|---|---|
| 2,178,256 | 10/1939 | Graybill | 43/87 |
| 4,389,807 | 6/1983 | Novak | 43/87 X |
| 4,581,844 | 4/1986 | Torkko | 43/87 |
| 4,751,790 | 6/1988 | Thomas | 43/87 |
| 4,757,639 | 7/1988 | Bertram | 43/85 X |
| 5,109,627 | 5/1992 | Lee | 43/88 |
| 5,142,813 | 9/1992 | Prostler | 43/81 |

FOREIGN PATENT DOCUMENTS

| | | | |
|---|---|---|---|
| 148104 | 9/1952 | Australia | 43/87 |
| 444596 | 3/1936 | European Pat. Off. | 43/87 |

*Primary Examiner*—Joseph J. Hail, III
*Assistant Examiner*—Anthony Ojini
*Attorney, Agent, or Firm*—Barnes, Kisselle, Raisch, Choate, Whittemore & Hulbert PC

[57] ABSTRACT

An animal trap comprises a swing frame mounted on a base. The swing frame has a pair of laterally spaced-apart arms and is pivoted to the base for swinging movement from a generally horizontal position to a generally upright position. A spring urges the swing frame to the upright position. A retainer releasably holds the swing frame in the horizontal position. A cable has one end anchored and the other end formed in a loop with the cable extending through the loop to form a noose. Opposite sides of the noose are releasably connected to the arms to hold the noose in an open condition. A baited lure is placed within the noose when the swing frame is horizontal and is operative when pulled by an animal to release the retainer and allow the swing frame to move to its upright position and the noose to snare an animal by the neck and tighten when the animal pulls away.

12 Claims, 1 Drawing Sheet

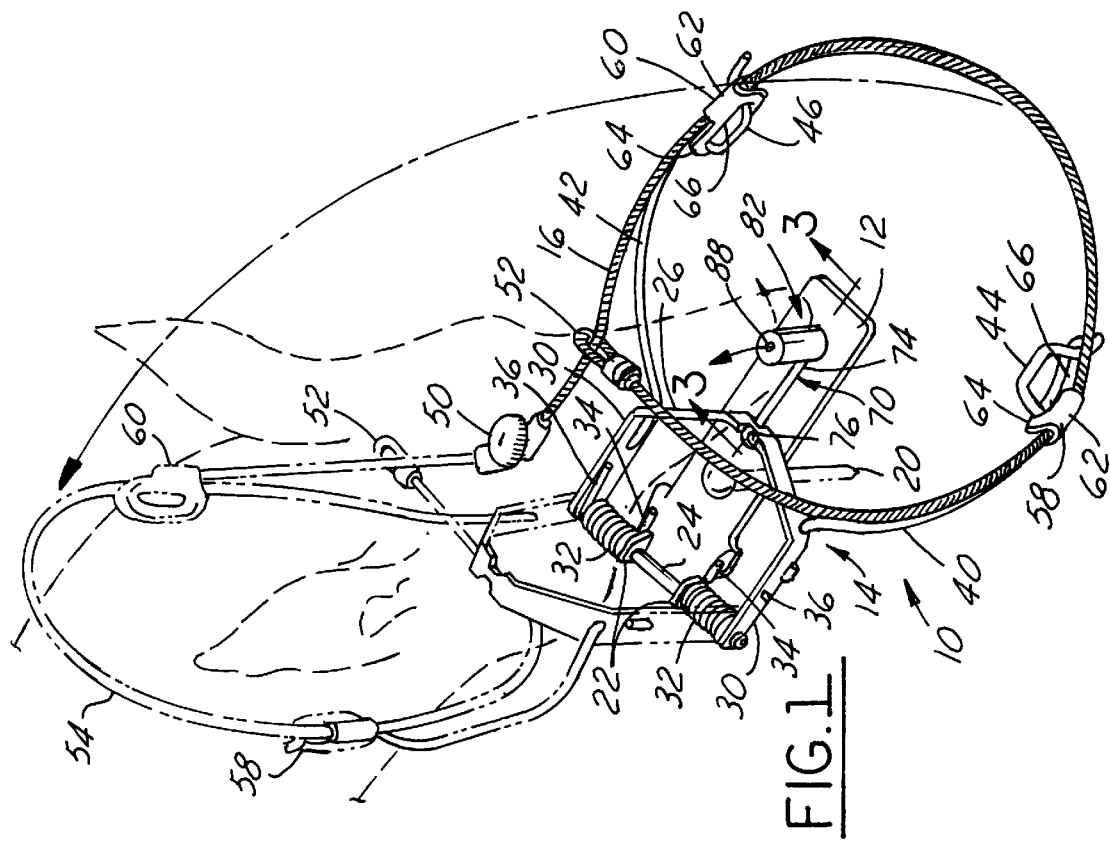
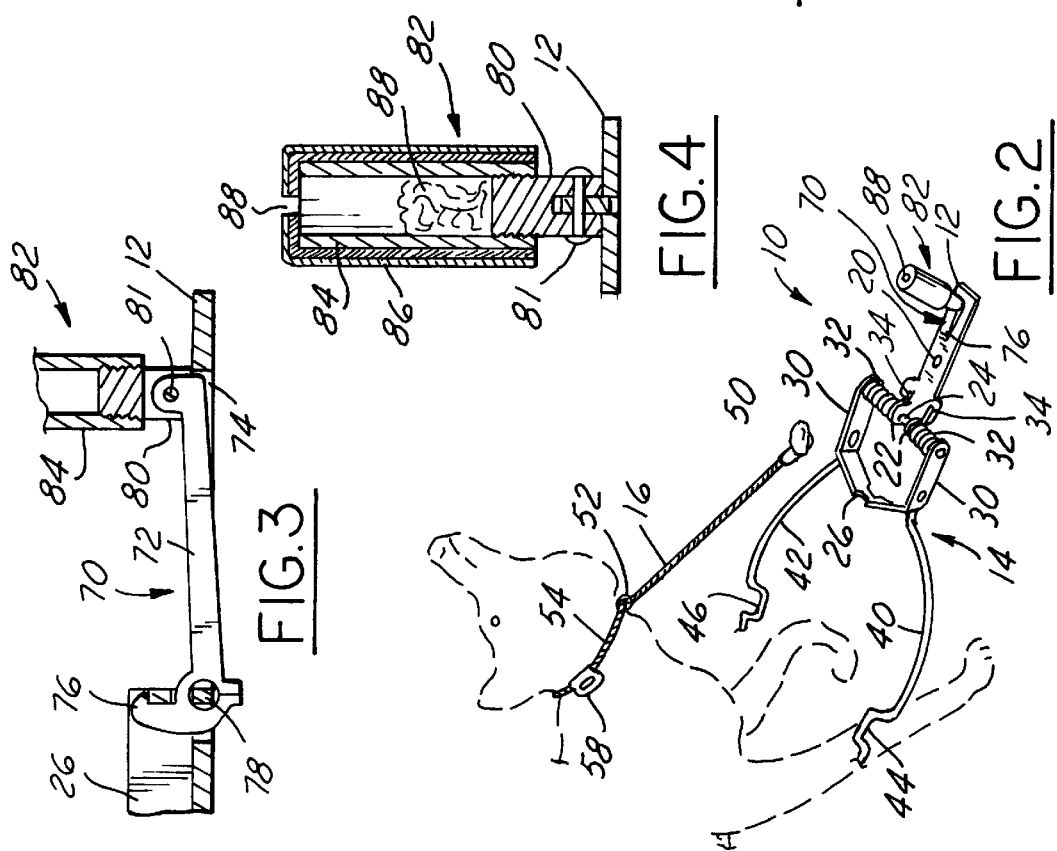

ANIMAL TRAP

FIELD OF INVENTION

This invention relates generally to animal traps and refers more particularly to a snare-type trap designed to catch an animal by the neck.

BACKGROUND AND SUMMARY OF THE INVENTION

Various versions of what is commonly known as a steel-jawed leghold trap have been used. Traps of this type all have one common characteristic, that is, the foot or leg of the animal is caught and gripped between two rigid, parallel steel bars that are held clamped by very powerful springs. When the trap is sprung, the steel jaws strike with great force, causing considerable trauma to the foot or leg which has been caught. The jaws close with such great force that it is not unusual for them to break the animal's foot or leg bones. As the animal fights to free itself, these jaws tend to cut in even deeper, often penetrating to the bone. The foot may become swollen and bloody and sometimes the trap jaws cut off substantially all blood flow, so that in extremely cold weather, the foot may freeze.

The so-called Victor Softcatch is a trap designed to eliminate some of this suffering. It is a conventional, coil-spring loaded, steel jawed trap that has rubber padding added to the jaws. The trap reduces some of the initial trauma and subsequent injury or damage, but an animal held for 12 to 24 hours often will display much of the same swelling and other damage caused by traps without padding.

I have recently invented a humane trap which will eliminate most of the trauma and damage or injury caused by conventional traps now in use. That trap is designed to grip the leg of an animal and is described in my U.S. Pat. No. 5,109,627.

I have more recently invented another trap which likewise is designed to eliminate trauma and damage or injury to the animal, and this trap, which catches the animal by the neck rather than the leg, is the subject of the present invention. In accordance with this invention, a trap is designed to place a cable of steel or other flexible material around an animal's neck to hold it in relatively unharmed condition. The trap is humane and is intended primarily for catching canines. This is because the triggering mechanism employed is rarely triggered by any other animal. Domestic dogs can accidentally be caught by the trap of my invention, but they can easily be released unharmed so that the trap is useful even in and around areas inhabited by humans and their pets.

The trap of this invention is especially useful where live capture and preservation is a goal such as in the capture of coyotes and foxes needed for study and experimentation.

The device of this invention is spring-loaded and triggered by a baited lure that the animal is attracted to and attempts to pick up and carry away. When the trap is triggered, a noose is forcibly thrown over the animal's head by two arms of a swing frame. The noose becomes disengaged from the trap as the noose tightens around the animal's neck when the animal jumps up and away. The noose is preferably staked down at one end independently of the trap. The trap may also be staked down.

One object of this invention is to provide an animal trap having the foregoing features and capabilities.

Another object is to provide an animal trap which is rugged and durable in use, is of relatively simple construction and capable of being inexpensively manufactured and operated.

These and other objects, features and advantages of the invention will become more apparent as the following description proceeds, especially when considered with the accompanying drawings.

BRIEF DESCRIPTION OF THE DRAWINGS

FIG. 1 is a perspective view of a trap constructed in accordance with the invention. Broken lines depict the trap after it has been triggered and engages the neck of an animal.

FIG. 2 is a perspective view showing an animal caught and held by the independently staked down cable. The trap is shown lying stretched out on the ground in fully sprung condition.

FIG. 3 is a fragmentary sectional view of the trigger mechanism, taken on the line 3—3 in FIG. 1.

FIG. 4 is an enlarged sectional view of the pull cap triggering device.

DETAILED DESCRIPTION OF THE PREFERRED EMBODIMENT

Referring now more particularly to the drawings, the animal trap 10 comprises a base 12, a swing frame 14, and an elongated, flexible linear member in the form of a cable 16. The cable 16 may be made of steel or any other suitable flexible material.

The base 12 is in the form of an elongated plate staked to the ground by a spike 20. At the rear of the plate are laterally spaced upstanding ears 22 rotatably supporting a cross pin 24. The swing frame 14 has a generally U-shaped frame member 26. The frame member 26 has side bars 30 and the ends of the side bars are pivoted to cross pin 24. Coiled torsion springs 32 encircle the cross pin 24. Each torsion spring 32 has one end 34 bearing on the base and the other end 36 connected to a side bar 30 of the frame member 26 to urge the swing frame to the generally upright or vertical position shown in dotted lines in FIG. 1.

The swing frame 14 has laterally spaced-apart arms 40 and 42 which extend radially outwardly from the pivot axis of the swing frame in the plane of the frame member 26. The inner ends of the arms 40, 42 are hooked into and thus rigidly secured to the opposite side bars 30 of the frame member 26. The arms 40 and 42 have channel-shaped offsets 44 and 46 near their outer ends which are displaced laterally inwardly toward one another.

The cable 16 has one end secured to the ground adjacent to the trap by a spike 50. The other end of the cable is folded over to form a loop 52 providing a slide connector. The cable extends through the loop to form a noose 54.

Secured to the cable 16 at opposite sides of the noose are clips 58 and 60. Each clip has a tubular portion 62 through which the cable extends and also has a plate portion 64 formed with an elongated slot 66 to releasably receive one of the offsets 44, 46 in an arm 40, 42 of the swing frame. In this manner, the noose 54 is held in an open condition. The clip 58 nearest to the end with the loop 52 is capable of sliding on the cable. The other clip 60 may be slidable but preferably is crimped onto the cable so that it is not capable of sliding.

The trap is set by forcing the swing frame 14 down to the solid line position of FIG. 1 in which the swing frame is horizontal and lays flat on the ground. The open noose 54 is releasably attached to the arms of the swing frame 14. The swing frame 14 is held in this position by a retainer 70 (FIG. 3). The retainer 70 is in the form of an elongated lever 72 which extends within an elongated slot 74 that extends lengthwise in the base 12. The lever 72 has a C-shaped terminal portion at one end forming a hook 76 which is adapted to engage over the midportion of the frame member 26 to hold the swing frame down in the horizontal position against the force of the torsion springs 32. The lever 72 is pivoted to the base by a pin 78 that extends across the slot 74 adjacent to the hook end of the lever. The opposite end of the lever is secured by pin 81 to a vertical mounting stud 80 of an upright pull cap 82 (FIG. 4) which rests upon the base 12.

The pull cap 82 has an open-ended sleeve 84 threaded on the stud 80 which preferably is wrapped with a layer of fabric 86 and dipped in paraffin to give it better lure holding properties. A hole 88 in the top of the fabric wrapping is provided so that a cotton ball 88 within the sleeve 84 can be fed by means of a dropper with a liquid lure material. The lure material will be a food product or anything that is highly appealing to an animal and will be brushed on the outside of the fabric 86 as well as coating the cotton ball 88. The pull cap 82 is a baited lure and serves as a release member for retainer 70 as will now be described.

The trap is set out for use in the position shown in solid lines in FIG. 1, preferably buried under dirt and invisible to the animal except for the pull cap 82 which should project up above the ground. The pull cap 82 is located within the noose. When the swing frame is in this position, the trap will preferably be backed by rocks, brush, etc. to cause the animal to approach from the direction as indicated in dotted lines in FIG. 1. When the animal bites and tries to pull up on the pull cap 82 and take it away, the lever 72 is pivoted to release the swing frame 14 whereupon the swing frame will pivot up to the substantially vertical position shown in dotted lines in FIG. 1 causing the noose to extend around the neck of the animal. When the animal jumps up and tries to pull away, the noose will tighten around his neck. The cable, although flexible, is preferably stiff enough to prevent choking the animal. The noose is, of course, staked to the ground so that the animal is caught and cannot get away.

It will be noted in FIG. 2 that the clips 58 and 60 on the noose will release from the swing frame arms 40 and 42 immediately after the swing frame pivots up and the noose begins to tighten around the animal's neck.

What is claimed is:

1. An animal trap comprising a base, a swing frame having a pair of laterally spaced-apart arms, means pivoting said swing frame to said base for swinging movement between a first position in which said arms are generally horizontal and a second position in which said arms are generally upright, spring means urging said swing frame to said second position, a retainer for releasably holding said swing frame in said first position, an elongated flexible linear member having first and second ends, an anchor securing the first end of said linear member in a fixed position, a slide connector on the second end of said linear member through which said linear member slidably extends to form a noose having opposite sides, means releasably connecting the opposite sides of said noose to said arms to maintain said noose open, and a release member located within the noose when the swing frame is in said first position, said release member being operative when disturbed by an animal to release said retainer and allow said swing frame to move to said second position and the noose carried thereby to snare the animal and to tighten when the animal pulls away.

2. An animal trap as defined in claim 1, wherein the means releasably connecting the opposite sides of the noose to said arms includes clips carried by said opposite sides, and said arms have outer ends releasably engaging said clips.

3. An animal trap as defined in claim 2, wherein each of said clips has an opening and the outer ends of said arms have channel-shaped offsets releasably engaged in said respective openings.

4. An animal trap as defined in claim 3, wherein at least the clip nearest said slide connector is slidably attached to said linear member.

5. An animal trap as defined in claim 3, wherein said linear member is formed in a loop at said second end thereof to provide said slide connector.

6. An animal trap as defined in claim 5, and further including means for anchoring said base in fixed position.

7. An animal trap comprising a base, a swing frame having a pair of laterally spaced-apart arms, means pivoting said swing frame to said base for swinging movement between a first position in which said arms are generally horizontal and a second position in which said arms are generally upright, spring means urging said swing frame to said second position, a retainer for releasably holding said swing frame in said first position, an elongated flexible linear member having first and second ends, an anchor securing the first end of said linear member in a fixed position, a slide connector on the second end of said linear member through which said linear member slidably extends to form a noose, said noose having opposite sides releasably connected to said arms to maintain said noose open, and a release member located within the noose when the swing frame is in said first position, said release member being operative when disturbed by an animal to release said retainer and allow said swing frame to move to said second position and the noose carried thereby to snare the animal and to tighten when the animal pulls away, the releasable connection of the opposite sides of the noose to said arms including clips carried by said opposite sides.

8. An animal trap as defined in claim 7, wherein said arms have outer ends releasably engaging said clips.

9. An animal trap as defined in claim 8, wherein each of said clips has an opening and the outer ends of said arms have offsets releasably engaged in said respective openings.

10. An animal trap as defined in claim 7, wherein at least the clip nearest said slide connector is slidably attached to said linear member.

11. An animal trap as defined in claim 7, wherein said linear member is formed in a loop at said second end thereof to provide said slide connector.

12. An animal trap as defined in claim 7, wherein said release member comprises a baited lure.

* * * * *